Figure 1:
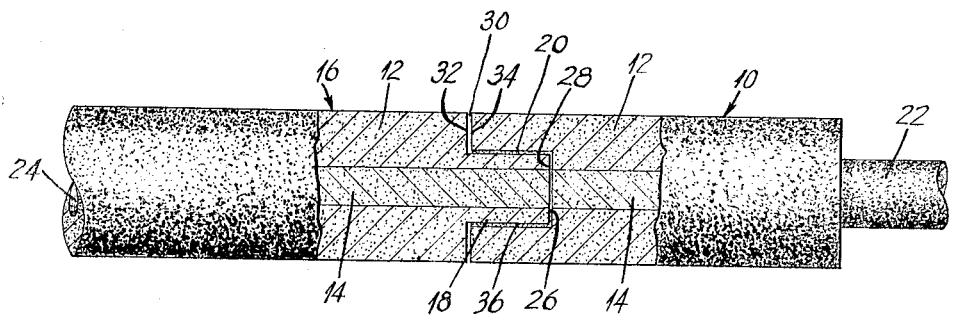

May 17, 1966  C. N. CLICK ETAL  3,251,926

ELECTRODE JOINT FOR JOINING NEGATIVE CARBON ELECTRODES

Filed Sept. 2, 1964

INVENTORS
CLIFFORD N. CLICK
WILBUR R. LAUZAU

BY
ATTORNEY

United States Patent Office 3,251,926
Patented May 17, 1966

3,251,926
ELECTRODE JOINT FOR JOINING NEGATIVE
CARBON ELECTRODES
Clifford N. Click and Wilbur R. Lauzau, Fostoria, Ohio, assignors to Union Carbide Corporation, a corporation of New York
Filed Sept. 2, 1964, Ser. No. 393,971
6 Claims. (Cl. 174—94)

This invention relates to the joining of arc carbon electrodes and more particularly, to a novel connection for negative arc carbon electrodes.

Arc carbon electrodes are employed in devices wherein the arc which is struck between a positive carbon and a negative carbon is employed as a source of illumination. These devices generally require that the arc function for indefinite duration of time as, for example, in a solar simulation device, or that it function for a definite period of time such as in certain types of search light apparatus. Providing sufficient lengths of the positive and negative carbons to sustain an arc for the desired duration is accomplished by joining carbons together. This method, in effect, produces endless carbons and may be accomplished in practice by threading a new carbon into the non-burning end of another carbon before the latter is entirely consumed by the arc.

Any variation in intensity or stability of the arc will naturally have a detrimental effect on the proper operation of the device in which the arc is employed. This problem of variation in intensity or stability of the arc is greatest when the joint which is formed when the carbons are joined in the above-mentioned manner is being burned through. Since the negative carbons burn at a much slower rate than the positive carbons, it is more difficult to obtain a smooth, stable burn through of negative carbon joints.

The difference in characteristics between a positive and a negative carbon may readily explain the difficulties encountered in applying the successful techniques which are employed in joining positive carbon electrodes to a connection involving negative carbon electrodes. During operation, for example, a negative carbon electrode has an area of high electron emission which is commonly known as a cathode spot. Arc stability is often dependent upon the cathode spot stability. To provide cathode spot stability, the central area of the negative carbon electrode is normally composed of a small amount of neutral core material. Furthermore, shell laminations, voids in the central area of the carbon, or loose pieces of carbon are several factors which adversely affect cathode spot stability and must be avoided. The positive carbon electrode, however, has no such analogous sensitive central zone. On the contrary, the positive carbon electrode requires shell or peripheral continuity and is readily adaptable for joining to other positive carbon electrodes.

More particularly, the negative carbon electrodes which are used in illumination applications are normally fabricated from a very hard, brittle, carbon material and generally have a relatively poor internal structure. In addition, they may contain abrasive inorganics as oxidation inhibitors. These characteristics are such as to render the precise machining of these electrodes an impractical and uneconomical undertaking.

In addition to the above enumerated problems, several other factors are to be considered in the construction of a negative carbon electrode connection. For example, as the electrode joint is burned through, care must be taken to prevent the cathode spot from wandering. In addition, the cathode spot area of one negative carbon electrode must necessarily be in full contact with the cathode spot area of the adjacent electrode in order that a continuous, smooth burning arc may be effected. Any interposed material such as cement will adversely affect the arc. Furthermore, effective carbon to carbon contact should be provided wherever possible in the connection since any internal voids or gaps will have a detrimental effect on the arc performance.

It is, therefore, the principal object of this invention to provide a novel connection for negative carbon electrodes wherein an arc which is used for illumination purposes burns smoothly and continuously.

Another object of this invention is to provide a novel connection for negative carbon electrodes having means provided whereby a continuous electrical path is achieved along the center line of the joined electrodes thereby preventing the cathode spot from wandering.

A still further object of this invention is to provide a novel connection for negative carbon electrodes having a means provided whereby complete carbon to carbon contact is realized between the end face of the protrusion on one electrode and the end face of the recess in the other electrode.

Still another object of this invention is to provide a novel connection for negative arc carbon electrodes having a means whereby effective carbon to carbon contact between electrodes within the connection is ensured.

Figure 2:
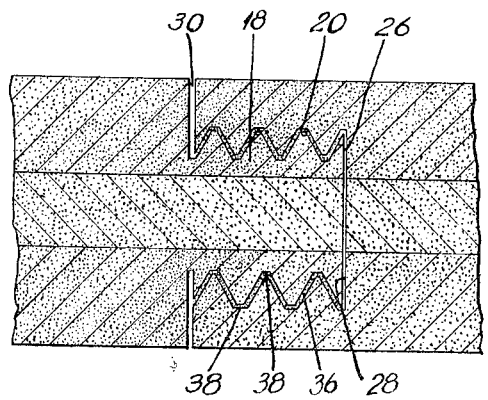

Other objects and advantages of the invention will become apparent from the following description, taken in conjunction with the following drawing wherein:

FIGURE 1 is a partial sectional view of a typical embodiment of the connection of the invention; and FIGURE 2 is an illustration of another embodiment of the connection of the invention which is shown in FIGURE 1.

Broadly, the objects of the invention are accomplished by a novel connection for negative carbon electrodes comprising a negative carbonaceous electrode having a protrusion and a recess disposed at opposite ends thereof, said protrusion being of a greater length than the depth of said recess, a second negative carbonaceous electrode having a similar recess and protrusion disposed at the opposite ends thereof, which second electrode is in direct contact with the first electrode, the protrusion of the first electrode being in direct electrical and mechanical contact with the bottom of the recess of the second electrode so as to form an air gap at the joint shoulder line, and a conductive material disposed between the side walls of the first electrode protrusion and the inner side walls of the second electrode recess. The connection between the protrusion and the recess is secured by providing an interference fit relationship between the protrusion and the recess, or by threading the protrusion and recess in such a fashion as to enable a protrusion of one electrode to communicate with a recess of another electrode, or by any other suitable mechanical means which is not dependent upon a cement for a secure mechanical bond. The electrically conductive material which is disposed between a protrusion and a recess and which thereby ensures an effective carbon to carbon contact in the joint, may be of any of a variety of suitable materials which are hereinafter further described.

In order that the connection of the invention be successfully constructed, the negative carbonaceous electrode should be of a material whereby it may be precisely machined. A number of suitable materials may be combined to give the desired negative electrode. A negative carbonaceous electrode which is constructed in the desired manner is illustrated in FIGURE 1.

The invention will be more readily understood by reference to the following drawings, and particularly FIGURE 1, wherein a connection for negative carbonaceous electrodes embodying the principles of the invention is illustrated.

Referring now to FIGURE 1, a negative carbonaceous electrode 10 comprising an outer shell 12 and an inner core 14 is in direct communication with a similar negative carbonaceous electrode 16. One electrode 16 has a protrusion 18 which fits into a recess 20 in the other electrode 10. On the opposite ends of these electrodes 10 and 16 are a protrusion 22 and a recess 24, respectively, thereby providing each electrode with a protrusion at one end and a recess in the other end. The front end face 26 of the protrusion 18 is in direct contact with the end face 28 of the recess 20. The drawing actually shows these two members slightly separated but this is merely for illustrative purposes. A gap 30 at the joint shoulder is provided between the shoulder face 32 of the electrode 16 and the shoulder face 34 of the electrode 10. An electrically conductive material 36 is dispersed between the protrusion 18 and the recess 20 along the full length and around the entire circumference of the protrusion 18 and is in direct contact with both the protrusion 18 and the recess 20.

The connection illustrated in FIGURE 1 may be suitably assembled by drilling the relatively large diameter recess 20 and forming the protrusion 18 to predetermined lengths. The length of the protrusion 18 is greater than that of the recess 20. The diameters of the recess 20 and the protrusion 18 are such that an interference fit results of such a nature that the protrusion 18 must necessarily be inserted by force into place. This interference fit is necessary for obtaining a secure mechanical bond. A suitable electrically conductive material 36 is applied to the surface of the protrusion 18 before insertion into the recess 20. The protrusion 18, already having the electrically conductive material 36 applied thereto, is then forced into an interference fit relationship with the recess 20 in such a manner that the front end face 26 of the protrusion 18 is in complete contact with the end face 28 of the recess 20. At this point, the presence of the gap 30 is manifested. This gap 30 is indicative of the excess length of the protrusion 18 over the recess 20. The gap 30 is necessary to direct the electrical current along the center line of the electrode assembly, thereby maintaining the central location of the cathode spot during the burn through of the joint.

The outer shell 12 suitably comprises a mixture of graphite flour, carbon black and pitch. A preferred mixture of 84 percent graphite flour, 16 percent carbon black and 32 parts per hundred of pitch is suggested. The graphite flour may be employed in a percentage range between 75 and 90 percent, the carbon black between 10 and 25 percent, and the pitch between 28 and 34 parts per hundred.

The inner core material may be any one of a number of suitable materials or combinations of materials. One such suitable combination of materials is a mixture of about 80% carbonaceous particles and about 20% of combined inorganic additives such as silicon, sulfur and potassium silicate.

After the outer shell mix is prepared, it is extruded in the shape of a hollow shell and baked at a temperature of about 1400° C. The shell is then cored with a suitable inner core material which is designated by the number 14 in FIGURE 1.

Since the primary advantage of the outer shell construction is that it provides a material which, in addition to having those favorable characteristics which are desired in a negative electrode of this type, is also easily machined, it is important that any machining operation be carried out within the material comprising the outer shell 12 and not in the core area 14. For this reason, it is impractical to assign specific dimensions to the outer shell area since the actual size will depend on the size of the electrode under construction and the dimensions of any recess or protrusion which may be made a part thereof.

The dimensions of the inner core area therefore, are also relative. The core area must be continuous and free from imperfections which would impart instability to the arc.

A negative carbon electrode with an outside diameter of 7/16 inch and an inner core diameter of approximately 1/10 inch is an illustration of one possible dimension combination.

It is understood that the above-described negative carbonaceous electrode is just one of a number of possible suitable negative electrodes which may be readily adaptable to the connection of the invention and, as such, is merely illustrative and is not intended to limit the scope of the invention.

The dimensions of the diameters of the protrusion and recess must be such that an interference fit results when they are joined. An 0.0005 inch interference on the diamters has been successfully tested and is illustrative of one possible interference fit.

The gap at the shoulders of the electrodes should be between 0.0005 inch and 0.005 inch to ensure a good "bottoming" effect at the end faces. In addition, this particular clearance factor will not be so great as to adversely affect the arc as the negative electrode connection is consumed by the arc at this point.

The electrically conductive material 36 which is used to ensure effective carbon to carbon contact in the joint of the invention and thereby provide a smooth, stable arc may be any one of a number of suitable materials. The preferred form of this material is that it be in the form of a finely divided powder, such a metal or graphite powder, dispersed in a medium which provides a cohesive, plastic mass. One example of a suitable mixture is:

TABLE 1

| Material: | Wt. percent |
| --- | --- |
| Silver powder | 70 |
| Epoxy resin | 30 |

Another example is:

TABLE 2

| Material: | Wt. percent |
| --- | --- |
| Silver powder | 60 |
| Epoxy resin | 25.2 |
| Triethanolamine | 2.8 |
| Silicon dioxide | 12.0 |

The mixture which is shown in Table 2 must be refrigerated until it is ready for use. It is often used as a conductive cement for bonding leads to carbon and graphite brushes. However, it is not a sufficent bonding agent to provide a secure mechanical bond in the joint of the invention and is merely used for its conductive characteristics.

It is understood that almost any conductive material in the form of a powder may be used in the connection of the invention. Because of its high electrical conductivity, silver is preferred as the conductive material but other materials such as Cu, Fe and Ni are also quite suitable. In addition, any viscous, non-volatizing medium may be used as a carrier.

The preferred method of applying the conductive material is by brush but spraying or dipping may also be employed.

The conductive material should not be applied to the front end face 26 of the protrusion because it would interfere with the fusion of electrodes at the front end face of the protrusion and the end face 28 of the recess. This in turn would cause an unstable, erratic arc.

Referring now to FIGURE 2, another embodiment of the connection of the invention is illustrated therein. The protrusion 18 is threaded 38 in such a manner that it may communicate with the recess 20 which is also threaded. The gap 30 once again ensures that the front end face 26 of the protrusion 18 will completely contact the end face 28 of the recess 20. The electrically conductive material 36, which was hereinbefore described, is dispersed between threaded portions 38 of the protrusion 18 and is in direct contact with both the protrusion 18 and the recess 20.

The threaded electrode may be designed with a number of fits depending upon the size of the cathode used. For example, a 7/16 inch outside diameter negative electrode was successfully tested with both a class 2 and a class 3A threaded fit.

From the foregoing, it will be appreciated that the invention provides a novel connection for negative arc carbon electrodes wherein means are provided to ensure a secure mechanical connection in the absence of a cement, means are provided to ensure effective carbon to carbon contact in the connection, and means are provided for ensuring a continuous, electrically conductive path along the center line of the joined negative carbon electrodes. As a result of the connection of the invention, a smooth, stable arc may be sustained for any desired duration in devices wherein the arc is employed as a source of illumination.

What is claimed is:

1. In a novel connection for negative carbonaceous electrodes, which connection includes a first negative electrode having a carbonaceous shell and core and having a shoulder face and recess, said recess having side walls and terminating within said electrode in an end face, a second negative electrode having a carbonaceous shell and core and having a shoulder face and a protrusion on one end, said protrusion having a front end face and side walls and residing in said recess, the improvement which comprises providing a circumferential air gap between said electrodes at said shoulder faces, said front end face on said protrusion being in direct contact with said end face in said recess.

2. The connection of claim 1 wherein said air gap is between 0.0005 inch and 0.005 inch.

3. The connection of claim 2 wherein an electrically conductive material is dispersed between the side walls of said protrusion and said recess.

4. The connection of claim 3 wherein said electrically conductive material comprises 70% by weight silver powder and 30% by weight epoxy resin.

5. The connection of claim 3 in which said electrically conductive material comprises 60% by weight silver powder, 25.2% by weight epoxy resin, 2.8% by weight triethanolamine and 12% by weight silicon dioxide.

6. The connection of claim 1 wherein said protrusion and said recess are provided with threads on the side walls thereof, said threads on said protrusion communicating with said threads on said recess.

References Cited by the Examiner
UNITED STATES PATENTS

| | | |
|---|---|---|
| 2,412,081 | 12/1946 | Droll. |
| 2,657,326 | 10/1953 | McCarty. |
| 2,744,945 | 5/1956 | Johnson. |
| 2,795,440 | 6/1957 | Holycross et al. |
| 3,030,544 | 4/1962 | Zamboldi et al. |
| 3,187,089 | 6/1965 | Cosby et al. ‗‗‗‗‗‗‗‗‗ 174—94 |

OTHER REFERENCES

Ulbricht, German app. No. 1,073,055, published 1/14/60.

ROBERT K. SCHAFFER, *Primary Examiner.*

DARREL L. CLAY, *Examiner.*